United States Patent
Miao et al.

(10) Patent No.: US 8,727,316 B1
(45) Date of Patent: May 20, 2014

(54) KNIFE GATE VALVE WITH URETHANE LINER

(76) Inventors: Hong Yan Miao, Montreal (CA); Wanqiang Wang, Montreal (CA)

( * ) Notice: Subject to any disclaimer, the term of this patent is extended or adjusted under 35 U.S.C. 154(b) by 302 days.

(21) Appl. No.: 13/069,437

(22) Filed: Mar. 23, 2011

(51) Int. Cl.
*F16K 3/00* (2006.01)

(52) U.S. Cl.
USPC ........... 251/327; 251/328; 251/329; 137/553; 137/556; 137/559

(58) Field of Classification Search
USPC ............ 251/326–329; 137/454.2–454.6, 559, 137/551–553
See application file for complete search history.

(56) References Cited

U.S. PATENT DOCUMENTS

| | | | |
|---|---|---|---|
| 2,893,684 A | | 7/1959 | Williams et al. |
| 3,993,092 A | | 11/1976 | Still |
| 4,009,727 A | | 3/1977 | Bailey |
| 4,201,365 A | | 5/1980 | Paptzun et al. |
| 5,370,149 A | * | 12/1994 | Clarkson et al. ............. 137/375 |
| 5,560,587 A | * | 10/1996 | McCutcheon et al. ........ 251/327 |
| 6,698,444 B1 | * | 3/2004 | Enston ...................... 137/15.06 |
| 7,100,893 B2 | | 9/2006 | Williams et al. |
| 7,350,766 B2 | | 4/2008 | Comstock et al. |
| 2006/0255305 A1 | * | 11/2006 | Comstock et al. ............ 251/328 |

OTHER PUBLICATIONS

DeZurik Urethane Knife Gate Valves. Plant Equipment Inc. http://www.plantequip.com/knife.html Accessed Sep. 23, 2009.
DeZurik https://www.sartellvalves.com/getdoc/8bdb2f40-ccbf-4c36-abb1- c341451d1608/32-00-1-pdf.aspx. Accessed Sep. 23, 2009.

* cited by examiner

*Primary Examiner* — John K Fristoe, Jr.
*Assistant Examiner* — Marina Tietjen
(74) *Attorney, Agent, or Firm* — Montgomery Patent & Design; Robert C. Montgomery

(57) ABSTRACT

A knife gate valve for specific environments comprises a knife valve with a body, a hand wheel, a yoke sleeve, a gland packing, a gland bushing, a stem, a wedge gate, seating surfaces and the like. All internal components of the device are provided with a high quality elastomeric liner. This surface is present on wetted surfaces such as body, seat and wedge surfaces exposed to the controlled material. This feature provides corrosion resistance, long life, and reduces leakage when compared to conventional valves. Its new style of internal design provides waterproof resistance for virtually types of industrial applications.

11 Claims, 6 Drawing Sheets

KNIFE GATE VALVE WITH URETHANE LINER

RELATED APPLICATIONS

The present invention was first described in a notarized Official Record of Invention on Jul. 31, 2009, that is on file at the offices of Montgomery Patent and Design, LLC, the entire disclosures of which are incorporated herein by reference.

FIELD OF THE INVENTION

The present invention relates generally to knife-style gate valves, and in particular, to a knife-style gate valve including an elastomeric liner construction particularly suited for use on wet scrubbers to control liquid slurry flow.

BACKGROUND OF THE INVENTION

Gate valves, also known as knife valves or slide valves, are a common item in industrial plants around the world. They are used in pipelines to control the flow of material through them. Their design ensures that pressure drops across an open valve are kept to a minimum. They are particularly useful when used with slurries or high viscosity liquids such as heavy oils, grease, or thick food products. However, their design also causes accelerated corrosion and erosion of seat and wedge surfaces due to their exposure. Over time, this erosion and corrosion will lead to failure of the valve requiring replacement which is not only costly from a time and labor standpoint, but from lost production from the associated industrial process as well. One (1) approach has been to attempt to construct gate valves with liners to combat these disadvantages.

Various attempts have been made to provide gate valves with liners for industrial use. Examples of these attempts can be seen by reference to several U.S. patents including U.S. Pat. No. 2,893,684; U.S. Pat. No. 3,993,092; U.S. Pat. No. 4,009,727; U.S. Pat. No. 4,201,365; U.S. Pat. No. 7,100,893; and U.S. Pat. No. 7,350,766.

While these apparatuses fulfill their respective, particular objectives, each of these references suffer from one (1) or more disadvantages including an undesirably substantial number of mechanical connections and specialized tools or machinery required during manufacture, installation, operation, and repair; limitations in molding, manufacture, and assembly of various components, particularly liner constructions such as found in U.S. Pat. No. 3,993,092 and U.S. Pat. No. 7,100,893; and eventual leakage and failure due to fatigue on gate or liner portions of the apparatus. Accordingly, there exists a need for a knife-style gate valve and liner without the disadvantages as described above. The development of the present invention substantially departs from the conventional solutions and in doing so fulfills this need.

SUMMARY OF THE INVENTION

In view of the foregoing references, the inventor recognized the aforementioned inherent problems. Thus, the object of the present invention is to solve the aforementioned disadvantages and provide for this need.

To achieve the above objectives, it is an object of the present apparatus to comprise many of the same components as found in common gate valve manufacturing including a near body assembly and a distal body assembly providing a characteristic assembly that can be used in normal piping systems being connected in a conventional manner via four (4) system connection apertures to flanged portions of the piping system, formation from a standard material such as carbon steel or stainless steel, a yoke providing containment and control of various components, and a bonnet for mounting a hand wheel and a stem which enable actuation of the apparatus. The near and distal body assemblies comprise a plurality of viewing holes providing a means to identify an open or closed state of the gate.

Another object of the present invention is to form the gate, a wetted component of the apparatus, of a high quality stainless steel and to include a liner for which the particular material construction would vary based upon the specific application. It is envisioned that primary applications of the apparatus would be in application such as Flue Gas Desulfurization (FGD) and more specifically on use on wet scrubbers to control the flow of abrasive slurries.

Yet still another object of the present invention is to provide a design which can be widely applied to many industry fields, such as chemical plants, power plants, pulp and paper mills, and wastewater treatment plants, mining fields, sugar mills and food-processing facilities. In addition, the design of this knife gate valve can reduce the use of non-renewable natural resources, such as Hastelloy, and avoid the environmental pollution by heavy metals.

Yet still another object of the present invention is to mount the gate within a wiper which operates at a close tolerance. The wiper is formed from a high quality elastomeric urethane liner and allows the gate to operate in between a near body liner and distal body liner also formed from a high quality elastomeric urethane liner. In this manner the wiper, the near body liner, and the distal body liner are the only components of the apparatus that are wetted, or actually touch the liquid or liquid slurry that is controlled by the valve.

Yet still another object of the present invention is to provide enhanced corrosion resistance, reduced wear, longer life, and reduced leakage as compared to common gate valves due to the elastomeric nature of the aforementioned components and the gate. This construction is further envisioned to provide superior waterproofing and corrosion resistance.

Yet still another object of the present invention is to locate the gate inside of the wiper in a location where the gate can interrupt a flow of liquids or liquid slurry through the near body liner and distal body liner.

Yet still another object of the present invention is to hold the elastomeric components of the apparatus in place with a friction fit inside of the near body assembly and the distal body assembly with a plurality of connection bolts in lieu of mechanical fastening. The assembly process enables simple manual assembly of the apparatus without the need for complicated tooling such as presses, coatings or other aids. This assembly can also be reversed to aid in repair and replacement of the wetted components under field conditions, allowing for a fast return to service and reduced down time requiring only common hand tools.

Yet still another object of the present invention is to provide a method of utilizing the device including assembling a majority of the components used in the knife-style gate valve with elastomeric liner such as the near body assembly, the distal body assembly, the yoke, the bonnet, the hand wheel, the stem, and the connection bolts using conventional materials and following conventional manufacturing techniques; manufacturing the specialized components of the wiper, the near body liner and the distal body liner using elastomeric materials; assembling the aforementioned components in a manner that allows for fast manufacturing as well as fast repair using normal procedures; installing the valve within a piping system in a similar manner to a common gate valve;

and using the valve to control abrasive fluids as previously described until replacement or repair is required.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
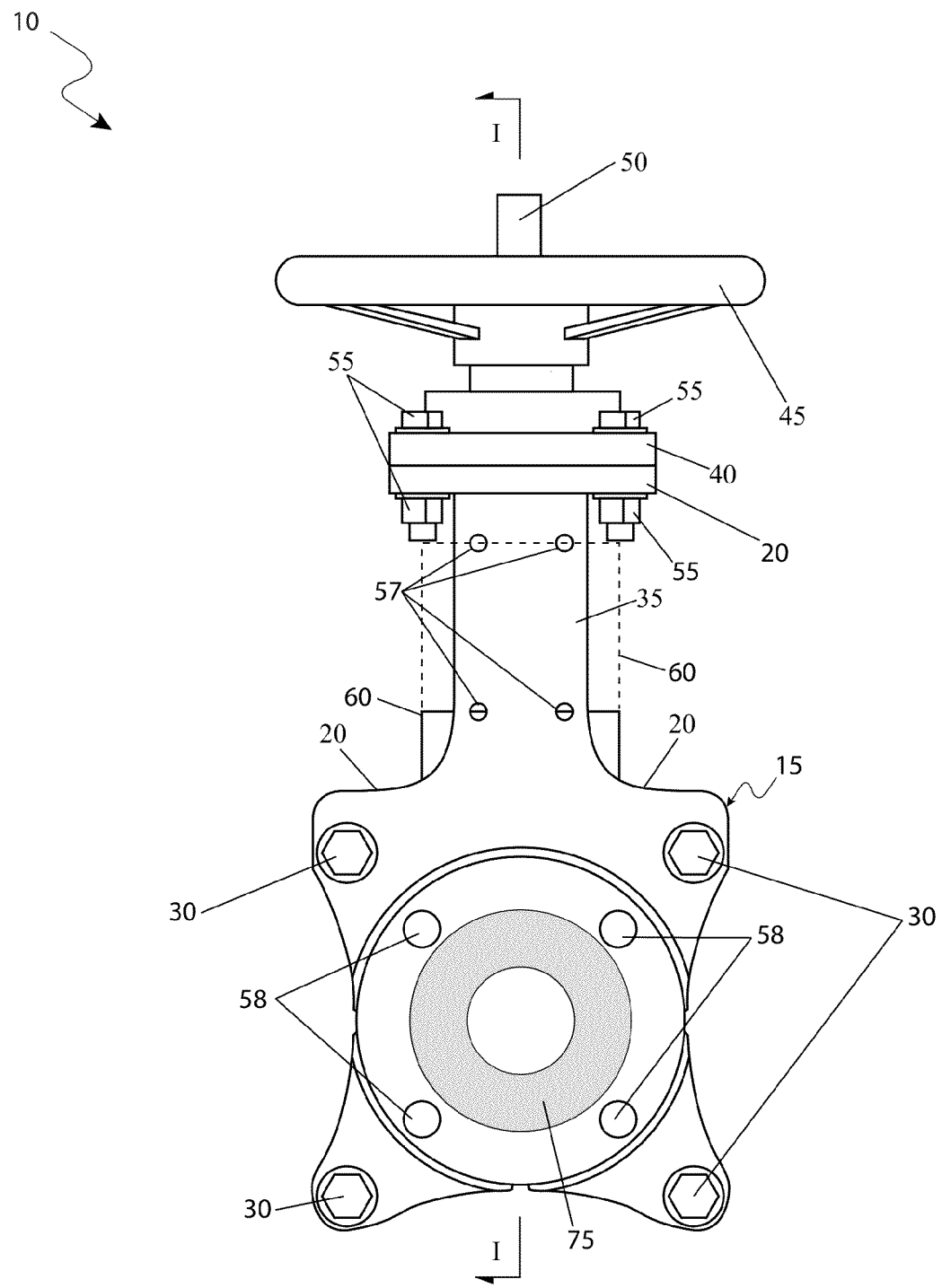
FIG. 1 is a front view of the knife-style gate valve with elastomeric liner 10 according to the preferred embodiment of the present invention.

DESCRIPTIVE KEY 10 knife-style gate valve with elastomeric liner
15 gate valve assembly
20 near body assembly
25 distal body assembly
60 gate
30 first connection bolt
35 yoke
40 bonnet
45 hand wheel
50 stem
55 second connection bolts
57 viewing hole
58 system connection apertures
65 wiper
70 link pin
75 near body liner
80 distal body liner

DETAILED DESCRIPTION OF THE PREFERRED EMBODIMENT

The best mode for carrying out the disclosure is presented in terms of a preferred embodiment, herein depicted within FIGS. 1 through 3d. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIG. 1, a front view of the knife-style gate valve with elastomeric liner 10, according to the preferred embodiment of the present invention, is disclosed. This figure demonstrates a gate valve assembly 15 comprised of many of the same components as found in the conventional teachings of gate valve manufacturing. A near body assembly 20 and a distal body assembly 25 (not visible in this figure) produce a characteristic assembly that can be used in normal piping systems being connected in a conventional manner via four (4) system connection apertures 58 to flanged portions of said piping system. The material of construction of the near body assembly 20 and distal body assembly 25 (not visible in this figure) is of standard material such as carbon steel, stainless steel, or the like. A yoke 35 is located above the gate valve assembly 15 and provides containment and control for remaining components of the knife-style gate valve with elastomeric liner 10. It should be noted that the near body assembly 20 and the distal body assembly 25 are incorporated with the yoke 35 on each respective side. Differentiation is made as the purpose of each respective assembly and not to said construction. A bonnet 40 is provided atop the yoke 35 and provides a mounting surface for a hand wheel 45 and a stem 50. When rotary motion is applied to the hand wheel 45 and subsequently transferred to the stem 50, the knife-style gate valve with elastomeric liner 10 is actuated. The direction of the rotary motion determines whether the knife style gate valve with elastomeric liner 10 is opening or closing as would normally be expected. Additionally, the near body assembly 20 and the distal body assembly 25 comprise a plurality of viewing holes 57 providing a means to identify an open or closed state of the gate 60. Viewing through an upper pair of viewing holes 57 in said body assemblies 20, 25 provides visibility of an upper edge of said gate 60 when in the open or raised state. In like manner, a lower pair of viewing holes 57 in each body assembly 20, 25 provides viewing of said upper edge of the gate 60 when said gate is in a closed or lowered state. Components are attached to the bonnet 40 and held captive by a set of four (4) second connection bolts 55 (only two (2) of which are visible in this orientation). Specialized components of the knife style gate valve with elastomeric liner 10 are primarily located inside of the near body assembly 20 and distal body assembly 25 (not visible in this figure) and will be described in greater detail herein below.

Figure 2:
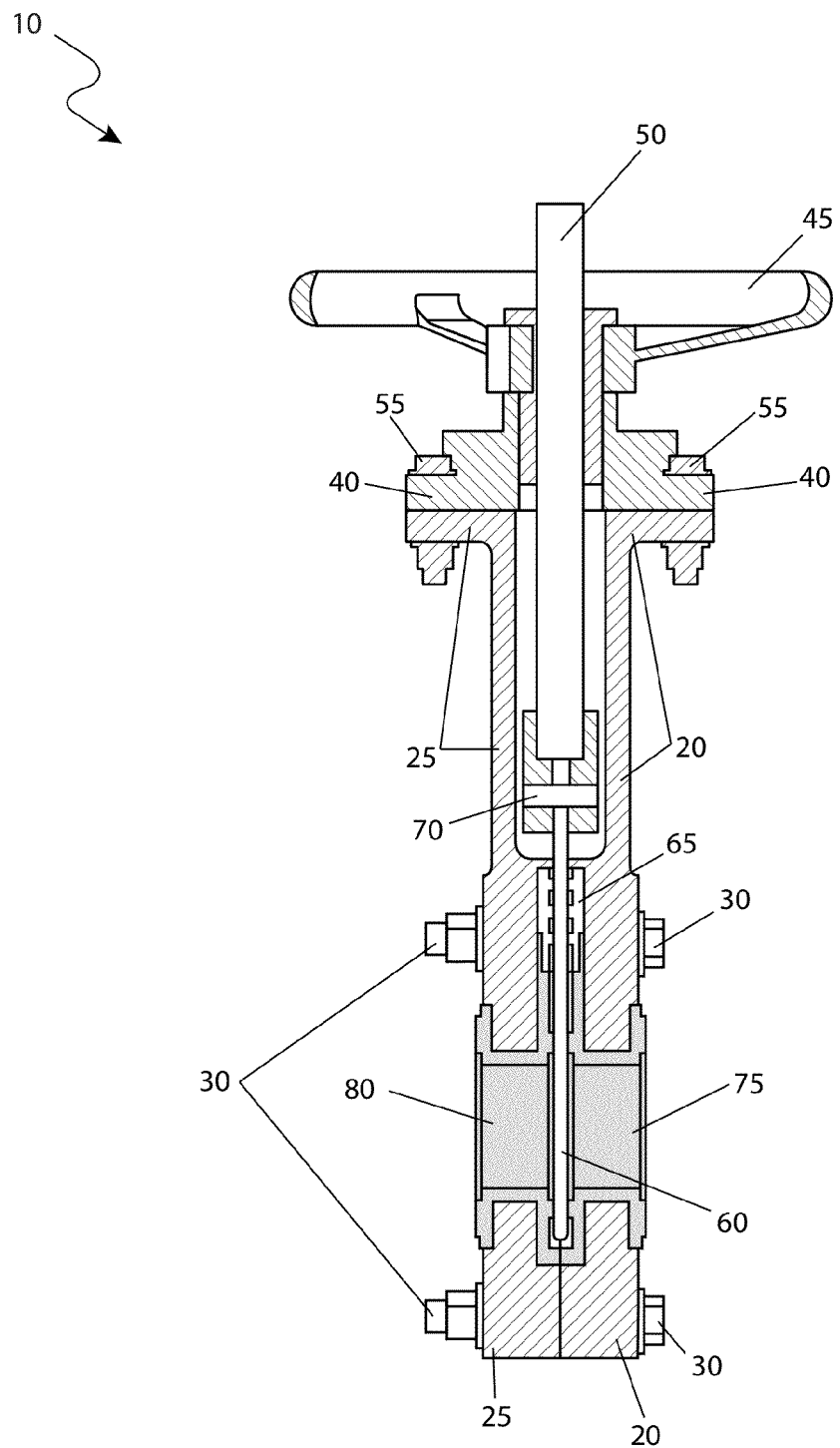
FIG. 2 is a sectional view of the knife-style gate valve with elastomeric liner 10 as seen along a line I-I, as shown in FIG. 1, according to the preferred embodiment of the present invention.

Referring next to FIG. 2, a sectional view of the knife-style gate valve with elastomeric liner 10, as seen along a line I-I, as shown in FIG. 1, according to the preferred embodiment of the present invention is depicted. The near body assembly 20 and the distal body assembly 25 are held captive by four (4) first 30 connection bolts. The near body assembly 20 and the distal body assembly 25 would be made of conventional material such as cast iron. The hand wheel 45 and the stem 50 are likewise connected to the bonnet 40 by the second connection bolts 55 as aforementioned described. The stem 50 is connected to a gate 60 via a link pin 70. The gate 60, a wetted component of the knife-style gate valve with elastomeric liner 10 is made of a high quality stainless steel. The exact makeup of the liner would vary from application to application and would depend upon the specific application. It is envisioned that primary applications of the knife-style gate valve with elastomeric liner 10 would be in application such as Flue Gas Desulfurization (FGD) applications and more specifically on use on wet scrubbers to control the flow of abrasive slurries. It can also be widely applied to many industry fields, such as chemical plants, power plants, pulp and paper mills, and wastewater treatment plants, mining fields, sugar mills and food-processing facilities. In addition, the design of this knife gate valve can reduce the use of non-renewable natural resources, such as Hastelloy, and avoid the environmental pollution by heavy metals. The gate 60 is mounted within a wiper 65 which operates at a close tolerance. The wiper 65 is of a high quality elastomeric urethane liner. The wiper 65 allows the gate 60 to operate in between a near body liner 75 and a distal body liner 80. Both the near body liner 75 and the distal body liner 80 are manufactured of high quality elastomeric urethane liner. It should be noted that the wiper 65, the near body liner 75, and the distal body liner 80 are the only components of the knife-style gate valve with elastomeric liner 10 that are wetted, or actually touch the liquid and/or liquid slurry that is controlled by the knife-style gate valve with elastomeric liner 10. Similarly, the wiper 65, the near body liner 75, and the distal body liner 80 are the only components of the knife-style gate valve with elastomeric liner 10 that are made with the high quality elastomeric liner while the gate 60 is made of stainless steel. Such material may be solid in nature, or may surround a core made of more rigid material such as metal. The elastomeric nature of said components provides for enhanced corrosion resistance, reduced wear, longer life, and reduced leakage when compared to conventional valves. It will also provide better waterproof and corrosion resistant performance as well.

Figure 3A:
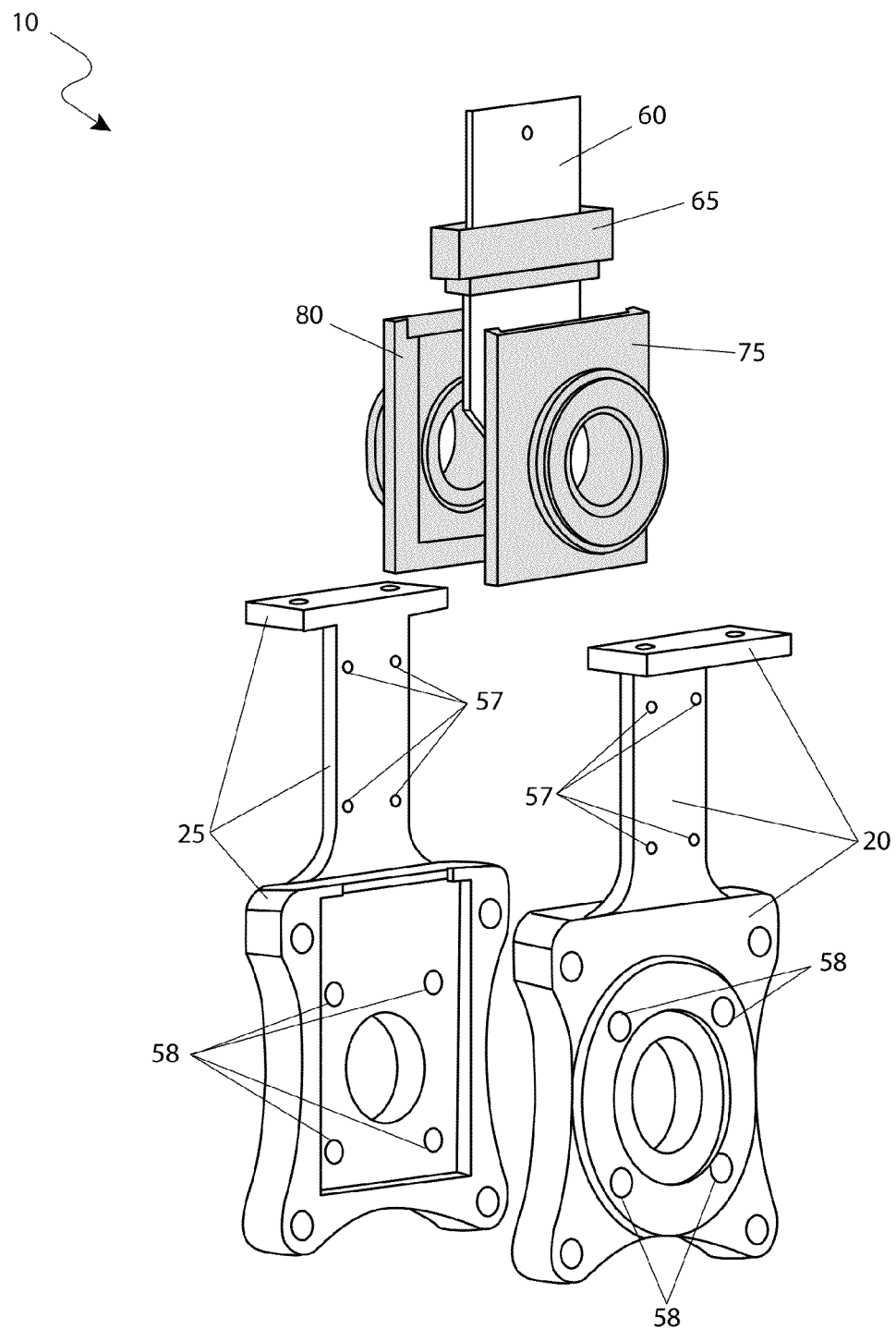
FIG. 3a is a partially exploded view of the knife-style gate valve with elastomeric liner 10 according to the preferred embodiment of the present invention.

Referring now to FIG. 3a, a partially exploded view of the knife style gate valve with elastomeric liner 10 according to the preferred embodiment of the present invention is shown. This figure clearly shows the components of the knife style gate valve with elastomeric liner 10 that are made of elastomeric materials, namely the gate 60, the wiper 65, the near body liner 75 and the distal body liner 80 shown in a general position and relationship to one another. Note that the wiper 65 is separate from the gate 60, but is simply shown together for the purposes of illustration. The gate 60 is inserted inside of the wiper 65, and in a location where the gate 60 may interrupt flow of liquids and/or liquid slurry through the near body liner 75 and distal body liner 80. It should be noted that these elastomeric components are not held in place via any direct mechanical or adhesive means attached to them directly. In lieu of such mechanical fastening, the gate 60, the wiper 65, and the near body liner 75 are held via a friction fit inside of the near body assembly 20 and the distal body assembly 25 via the first connection bolts 30 (as shown in FIG. 1 and FIG. 2). Additional descriptions herein below will further describe the assembly process. Said assembly process provides for easy hand assembly with the need for complicated tooling such as presses, coatings or other aids. Said assembly can also be reversed to aid in repair and replacement of the wetted components under field conditions allowing for a fast return to service and reduced down time using only common hand tools.

Figure 3B:
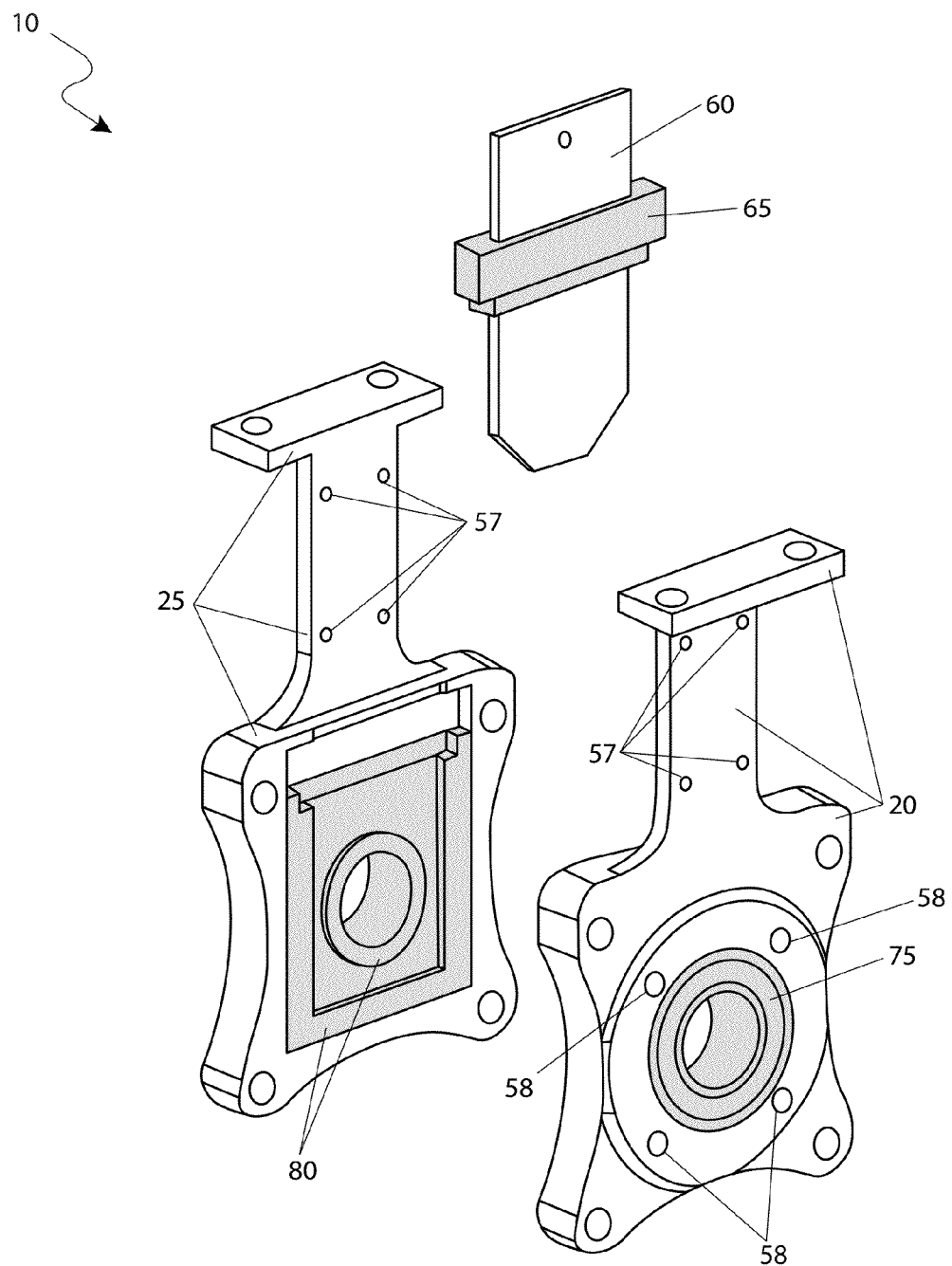
FIG. 3b is another partially exploded view of the knife-style gate valve with elastomeric liner 10 according to the preferred embodiment of the present invention.

Referring next to FIG. 3b, another partially exploded view of the knife-style gate valve with elastomeric liner 10 according to the preferred embodiment of the present invention is disclosed. This figure shows the distal body liner 80 installed inside of the distal body assembly 25 and held in place via a friction fit. Likewise the near body liner 75 (not visible in this configuration) is placed within the near body assembly 20. The gate 60 and wiper 65 remain as depicted in FIG. 3a awaiting installation.

Figure 3C:
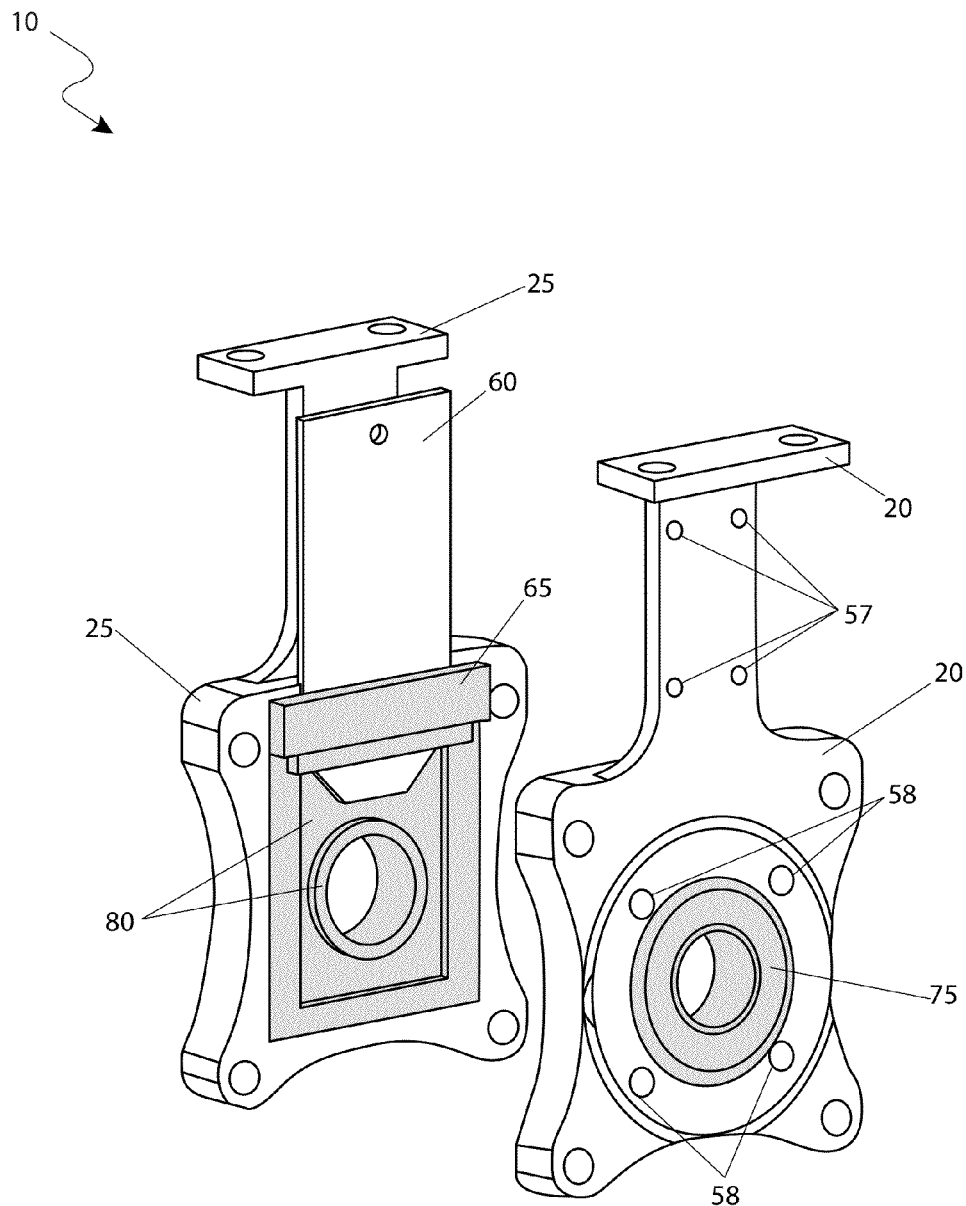
FIG. 3c is still another partially exploded view of the knife-style gate valve with elastomeric liner 10 according to the preferred embodiment of the present invention; and, FIG. 3d is yet another partially exploded view of the knife-style gate valve with elastomeric liner 10 according to the preferred embodiment of the present invention.

Referring now to FIG. 3c, still another partially exploded view of the knife-style gate valve with elastomeric liner 10 according to the preferred embodiment of the present invention is depicted. This figure shows the gate 60 and wiper 65 in place against the distal body assembly 25 and distal body liner 80 awaiting additional construction. As aforementioned described the near body liner 75 (not visible in this configuration) remains placed within the near body assembly 20 awaiting additional manufacturing steps.

Figure 3D:
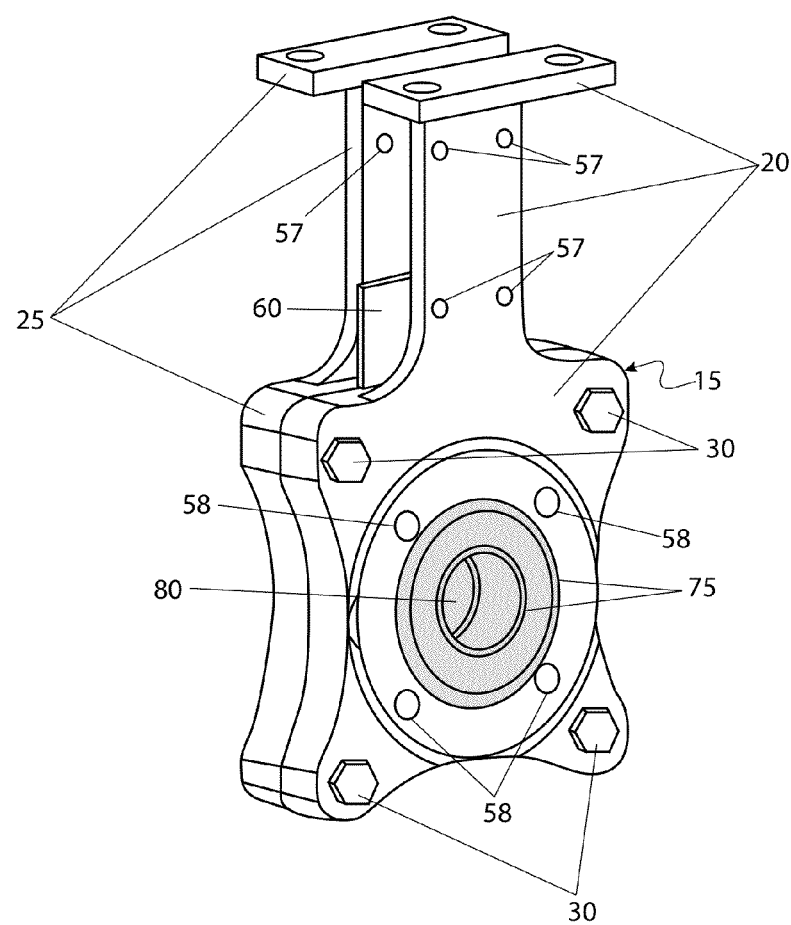

Referring finally to FIG. 3d, yet another partially exploded view of the knife-style gate valve with elastomeric liner 10 according to the preferred embodiment of the present invention is shown. This figure shows all materials made of elastomeric materials, namely the gate 60, the wiper 65, the near body liner 75 and the distal body liner 80, placed within the confines of the near body assembly 20 and the distal body assembly 25. Such components are held in place and are secured via the first connection bolts 30 and the second connection bolts 55 as shown in FIG. 1 and FIG. 2. Said construction is not unlike that afforded by conventional gate valves. The time interval between the construction steps depicted in FIG. 3a and FIG. 3d is envisioned to be only minutes. Similar but reverse construction techniques would be followed for repair and/or rebuilding activities.

In a non-limiting exemplary embodiment of the present invention 10, the gate valve assembly 15 may be intercalated between the distal and near body assemblies 25, 20. The hand wheel 45 preferably actuates the gate valve assembly 15 between the distal and near body assemblies 25, 20 respectively, and subjacent to the stem 50. Advantageously, rotation of the hand wheel 45 causes the gate 60 to linearly reciprocate through the wiper 65. In this manner, the stem 50 preferably rotates in sync with the hand wheel 45.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the knife-style gate valve with elastomeric liner 10 would be constructed in general accordance with FIG. 1 through FIG. 3d.

The majority of the components used in the knife-style gate valve with elastomeric liner 10 such as the near body assembly 20, the distal body assembly 25, the first connection bolts 30, the yoke 35, the bonnet 40, the hand wheel 45, the stem 50, and the second connection bolts 55 would be made using conventional materials and follow conventional manufacturing techniques. The specialized components of the wiper 65, the near body liner 75 and the distal body liner 80, would be made using elastomeric materials. Said components would be the only components of the knife-style gate valve with elastomeric liner 10 that would come in contact with controlled or transferred material, hence the name "wetted". Said assembly of the gate 60, the wiper 65, the near body liner 75 and the distal body liner 80, within the near body assembly 20 and distal body assembly 25 would follow the specific steps outlined within FIGS. 3a-3d. This procedure would allow for fast manufacture as well as fast repair using normal procedures. At this point in time, the knife-style gate valve with elastomeric liner 10 is ready for specific application as a gate valve.

The knife-style gate valve with elastomeric liner 10 would be installed within a piping system using the system connection apertures 58 in the same manner as any other gate valve. The overall dimensions of the knife-style gate valve with elastomeric liner 10 would closely follow those of conventional gate valves allowing for retrofit applications.

The knife-style gate valve with elastomeric liner 10 would be held in place via the first connection bolts 30 as would be normally expected. At this point in time the knife-style gate valve with elastomeric liner 10 would be placed in service controlling abrasive fluids as aforementioned described until replacement or repair would be required.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A knife-style gate valve for use on wet scrubbers to control liquid slurry flow, said knife-style gate valve comprising:
    a near body assembly;
    a distal body assembly connected to said near body assembly;
    a bonnet located atop said near and distal body assemblies;
    a hand wheel connected to said bonnet;
    a gate valve assembly intercalated between said distal and near body assemblies, comprising:
        a near body liner;
        a distal body liner;
        a wiper positioned above said near and distal body liners; and,
        a gate passing through said wiper;
    a stem connected to said bonnet; and,
    a link pin connecting said stem to said gate valve assembly;
    wherein each of said near and distal body assemblies further comprises:
        a yoke located above said gate valve assembly and attached to said bonnet;
        a plurality of viewing holes formed in said yoke for identifying an open or a closed state of said gate valve assembly; and,
        a plurality of connection apertures located at flanged portions of said near body assembly and said distal body assembly respectively;
    wherein said hand wheel actuates said gate between said distal and near body assemblies respectively;
    wherein rotation of said hand wheel causes said gate to linearly reciprocate through said wiper;
    wherein said wiper allows said gate to operate in between said near body liner and said distal body liner;
    wherein said gate is visible through an upper set of said viewing holes when said gate is at said open state;
    wherein said gate is visible through a lower set of said viewing holes when said gate is at said closed state; and,
    wherein said near body liner and said distal body liner pass through an entire cross-section of said near body assembly and said distal body assembly, respectively.

2. The knife-style gate valve of claim 1, wherein said stem rotates in sync with said hand wheel.

3. The knife-style gate valve of claim 1, wherein said gate is inserted inside of said wiper such that said gate interrupts liquid flow through said near body liner and said distal body liner.

4. The knife-style gate valve of claim 1, wherein said gate, said wiper, said near body liner and said distal body liner are friction fitted inside said near body assembly and said distal body assembly.

5. The knife-style gate valve of claim 1, wherein said gate, said wiper, said near body liner, and said distal body liner are wetted.

6. A knife-style gate valve for use on wet scrubbers to control liquid slurry flow, said knife-style gate valve comprising:
    a near body assembly;
    a distal body assembly connected to said near body assembly;
    a bonnet located atop said near and distal body assemblies;
    a hand wheel connected to said bonnet;
    a gate valve assembly intercalated between said distal and near body assemblies, further comprising:
        a near body liner;
        a distal body liner;
        a wiper positioned above said near and distal body liners; and,
        a gate passing through said wiper;
    a stem connected to said bonnet; and,
    a link pin connecting said stem to said gate valve assembly;
    wherein each of said near body assembly and said distal body assembly comprises:
        a yoke located above said gate valve assembly and attached to said bonnet;
        a plurality of viewing holes formed in said yoke for identifying an open or a closed state of said gate valve assembly; and,
        a plurality of connection apertures located at flanged portions of said near body assembly and said distal body assembly respectively;
    wherein said hand wheel actuates said gate between said distal and near body assemblies respectively and subjacent to said stem;
    wherein said wiper allows said gate to operate in between said near body liner and said distal body liner;
    wherein rotation of said hand wheel causes said gate to linearly reciprocate through said wiper;
    wherein said gate is visible through an upper set of said viewing holes when said gate is at said open state;
    wherein said gate is visible through a lower set of said viewing holes when said gate is at said closed state; and,
    wherein said near body liner and said distal body liner pass through an entire cross-section of said near body assembly and said distal body assembly, respectively.

7. The knife-style gate valve of claim 6, wherein said stem rotates in sync with said hand wheel.

8. The knife-style gate valve of claim 6, wherein said gate is inserted inside of said wiper such that said gate interrupts liquid flow through said near body liner and said distal body liner.

9. The knife-style gate valve of claim 6, wherein said gate, said wiper, said near body liner and said distal body liner are friction fitted inside said near body assembly and said distal body assembly.

10. The knife-style gate valve of claim 6, wherein said gate, said wiper, said near body liner, and said distal body liner are wetted.

11. A method of utilizing a knife-style gate valve for use on wet scrubbers to control liquid slurry flow, said method comprising the steps of:
    providing a near body assembly;
    providing a distal body assembly;
    providing and locating a bonnet atop said near and distal body assemblies;
    providing and connecting a hand wheel to said bonnet;

providing and intercalating a gate valve assembly between said distal and near body assemblies;
providing and connecting a stem to said bonnet;
providing and connecting a link pin said stem to said gate valve assembly;
connecting said distal body assembly to said near body assembly; and,
said hand wheel actuating said gate between said distal and near body assemblies respectively;
wherein each of said near body assembly and said distal body assembly comprises:
- a yoke located above said gate valve assembly and attached to said bonnet;
- a plurality of viewing holes formed in said yoke for identifying an open or a closed state of said gate valve assembly; and,
- a plurality of connection apertures located at flanged portions of said near body assembly and said distal body assembly respectively;

wherein said gate valve assembly comprises:
- a near body liner;
- a distal body liner;
- a wiper positioned above said near and distal body liners; and,
- a gate passing through said wiper;

wherein said wiper allows said gate to operate in between said near body liner and said distal body liner;
wherein rotation of said hand wheel causes said gate to linearly reciprocate through said wiper;
wherein said gate is visible through an upper set of said viewing holes when said gate is at said open state;
wherein said gate is visible through a lower set of said viewing holes when said gate is at said closed state; and,
wherein said near body liner and said distal body liner pass through an entire cross-section of said near body assembly and said distal body assembly, respectively.

* * * * *